(12) United States Patent
Soshiroda et al.

(10) Patent No.: US 9,085,816 B2
(45) Date of Patent: Jul. 21, 2015

(54) STEEL SHEET HAVING EXCELLENT WELDABILITY

(75) Inventors: Tetsuo Soshiroda, Kakogawa (JP); Reiichi Suzuki, Fujisawa (JP); Kei Yamazaki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 865 days.

(21) Appl. No.: 12/488,140

(22) Filed: Jun. 19, 2009

(65) Prior Publication Data
US 2009/0252955 A1    Oct. 8, 2009

Related U.S. Application Data

(62) Division of application No. 11/560,147, filed on Nov. 15, 2006, now abandoned.

(30) Foreign Application Priority Data

Dec. 27, 2005 (JP) .................. 2005-375844

(51) Int. Cl.
| | |
|---|---|
| *C22C 38/04* | (2006.01) |
| *C22C 38/02* | (2006.01) |
| *C22C 38/06* | (2006.01) |
| *C22C 38/60* | (2006.01) |
| *C22C 38/00* | (2006.01) |
| *C22C 33/00* | (2006.01) |
| *C21D 6/00* | (2006.01) |
| *C21D 8/04* | (2006.01) |
| *C21D 9/46* | (2006.01) |
| *B23K 35/02* | (2006.01) |
| *B23K 35/30* | (2006.01) |
| *C21C 7/10* | (2006.01) |

(52) U.S. Cl.
CPC ............. *C22C 38/02* (2013.01); *C21D 6/008* (2013.01); *C21D 8/0426* (2013.01); *C21D 9/46* (2013.01); *C22C 38/04* (2013.01); *C22C 38/06* (2013.01); *B23K 35/0261* (2013.01); *B23K 35/3073* (2013.01); *B23K 2201/16* (2013.01); *C21C 7/10* (2013.01); *Y10T 428/265* (2015.01)

(58) Field of Classification Search
None
See application file for complete search history.

(56) References Cited

U.S. PATENT DOCUMENTS

| | | | |
|---|---|---|---|
| 6,632,296 B2 * | 10/2003 | Yoshinaga et al. | ............ 148/320 |
| 2005/0139293 A1 | 6/2005 | Nomura et al. | |
| 2007/0029015 A1 * | 2/2007 | Yoshinaga et al. | ............ 148/533 |

FOREIGN PATENT DOCUMENTS

| | | | | |
|---|---|---|---|---|
| EP | 1 548 142 A1 | 6/2005 | | |
| JP | 61-7089 | 1/1986 | | |
| JP | 9-31536 | 2/1997 | | |
| JP | 10-280087 | 10/1998 | | |
| JP | 2000-34537 | 2/2000 | | |
| JP | 2000-109946 | 4/2000 | | |
| JP | 2000-119750 | 4/2000 | | |
| JP | 2000-167691 | 6/2000 | | |
| JP | 2000-313939 | 11/2000 | | |
| JP | 2001-152287 | 6/2001 | | |
| JP | 2001-192767 | 7/2001 | | |
| JP | 2001-303175 | 10/2001 | | |
| JP | 2002-155337 | 5/2002 | | |
| JP | 2002-173735 | 6/2002 | | |
| JP | 2002-356744 | 12/2002 | | |
| JP | 2003-3240 | 1/2003 | | |
| JP | WO 2005/031024 | * | 4/2005 | .............. C22C 38/00 |
| JP | 2005-187853 | 7/2005 | | |
| JP | 2005-281842 | 10/2005 | | |
| JP | 2006-274338 | 10/2006 | | |
| JP | 2006-312773 | 11/2006 | | |
| KR | 10-2005-0082417 | 8/2005 | | |
| WO | 2005/005670 A1 | 1/2005 | | |
| WO | 2008/004453 | 1/2008 | | |

* cited by examiner

*Primary Examiner* — Yoshitoshi Takeuchi
(74) *Attorney, Agent, or Firm* — Oblon, McClelland, Maier & Neustadt, L.L.P.

(57) ABSTRACT

Disclosed is a steel sheet, containing: Si: 0.20-2% (the term "%" herein means "mass %", the same is true hereinbelow), Mn: 1-2.5%, a total mass of Si and Mn being 1.5% or more, and O: 0.002% or less (exclusive of 0%), C: 0.02-0.25%, P: 0.1% or less (exclusive of 0%), S: 0.05% or less (exclusive of 0%), Al—0.02-0.2%, and N: 0.0015-0.015%. The steel sheet of the invention can be advantageously used for forming wide beads even in high-speed arc welding of 100 cm/min or higher.

13 Claims, No Drawings

STEEL SHEET HAVING EXCELLENT WELDABILITY

BACKGROUND OF THE INVENTION

1. Field of the Invention

The present invention relates in general to a steel sheet used as a material for automotive parts through welding, more specifically to a high tensile steel sheet excellent in high-speed arc weldability, capable of forming wide beads at an arc welding speed as high as 100 cm/min or above.

2. Description of the Related Art

Diverse welding processes are involved in assembly of automotive parts, and among them is a gas shielded arc welding particularly for an assembly of parts that need to have superior rigidity. This is because arc welding is generally known to increase joint strength, stabilize welding quality, and improve rigidity of parts. However, a shortcoming of the arc welding is that it takes a longer time than other processes such as cutting, pressing, and coating. Because of this, when arc welding is employed, production line speed is deteriorated, leading to an increase in production cost. Therefore, if the arc welding speed of steel sheets can be increased, the cost of production would be substantially reduced and it will be very meaningful industrially.

For instance, an invention in Japanese Patent Laid-Open No. S61-007089 tried to achieve high-speed gas shielded arc welding by incorporating a specific amount of Si and Mn into a steel wire for gas shielded arc welding. Unfortunately though, the cited invention is mainly directed to specify the composition of the wire, and does not necessarily take rigidity of a steel sheet into consideration. In addition, the cited invention unnecessarily defines the content of oxygen in the wire as 0.008% or more, so as to attain ripple uniformity of beads and reduction of tension on the beads.

Moreover, Japanese Patent Laid-Open No. 2000-167691 takes the composition of a steel sheet into account for arc welding of a high tensile steel sheet. The gist of the cited invention lies in a welding procedure of a high tensile steel sheet by specifying "Si content in the steel sheet (mass %)+Si content in the wire (mass %)≥1.5". However, as the cited invention carries out such welding process at a speed of 30-60 cm/min, it is evident that the objective of the invention is not in accomplishment of a high speed arc welding process. Besides, the cited invention does not have any description about the influence of oxygen on arc welding.

In general, width of beads tends to decrease in a high-speed arc welding process. Thus, in order to put high-speed arc welding to practical use, it is necessary to ensure the width of beads to a certain extent particularly because groove position or wire position is often deviated or route gap is created during an actual arc welding process. However, none of the above-described cited inventions studied width of the bead during high speed arc welding.

Although there is a strong demand for light (thin) steel sheets in terms of enhancement of fuel efficiency in automobile industry, it should not outweigh the collision safety. To satisfy both sides, i.e., to obtain light and collision-safe steel sheets, more automobile manufacturers now use high tension steel sheets of reduced thickness. Such thin steel sheets, however, were easily melted away during high current arc welding so it was not easy to have a sufficient amount of welding at high current. Because of this, the welding bead width of a thin steel sheet has been narrowed and thus, it became necessary to ensure increased bead width. Furthermore, since high tensile steel, compared with mild steels, has poor stability in a pressing process, the route gap is easily increased. Therefore, there is a need to develop a way for increasing the bead width.

SUMMARY OF THE INVENTION

It is, therefore, an object of the present invention to provide a high tensile steel sheet excellent in high-speed arc weldability, capable of forming wide beads at an arc welding speed as high as 100 cm/min or above.

To achieve the above objects and advantages, there is provided a steel sheet, containing: Si: 0.20-2% (the term "%" herein means "mass %", the same is true hereinbelow), and Mn: 1-2.5%, a total mass of Si and Mn being 1.5% or more, and O: 0.002% or less (exclusive of 0%), C: 0.02-0.25%, P: 0.1% or less (exclusive of 0%), S: 0.05% or less (exclusive of 0%), Al: 0.02-0.2%, and N: 0.0015-0.015%.

In the steel sheet of the invention, the thickness of an inner oxide layer existing in a surface layer is preferably 5 µm or less.

To improve hardenability, the steel sheet of the invention preferably contains at least one element selected from the group consisting of Cr: 0.03-2%, Mo: 0.03-1% or less, and B: 0.0003-0.005%. In addition, for precipitation strengthening, the steel sheet of the invention preferably contains at least one element selected from the group consisting of Nb: 0.005-0.1%, Ti: 0.005-0.3%, V: 0.005-0.5%, and W: 0.005-0.5%.

From the viewpoint of corrosion resistance, the steel sheet of the invention may further include Cu: 0.03-0.5% or less. When the steel sheet contains Cu as defined, it may further contain Ni: 0.015-0.5%. In addition, to enhance workability, the steel sheet of the invention may contain Ca: 0.0005-0.005% and/or REM (rare earth elements): 0.0005-0.005%, or Zr and/or Mg: 0.0005-0.005% in total. Moreover, to improve ductility, the steel sheet of the invention may contain Co: 0.03-1%.

After careful analysis and proven results, the inventors discovered that Si and Mn generate advantageous effects in high speed arc welding. However, they also found out that if an excessive amount of Si was used, more slags were formed on a weld bead, and coating came off easily. Meanwhile, if an excessive amount of Mn was used, workability of the steel sheet was deteriorated. Therefore, instead of using Si and Mn singly and excessively, they should be incorporated together. In so doing, the weld beads had superior corrosion resistance and workability, and the beads were sufficiently wide after suppressing so-called humping of weld beads which is a problem that an irregular bead shape and width is formed in the welding.

Nevertheless, even though the total content of Si and Mn satisfies the defined limit, in high-speed arc welding at a speed of 100 cm/min or higher, humping of weld beads occurs and bead width is not sufficient. The inventors later discovered after a more thorough examination that O (oxygen) contained in the steel sheet exerted a bad influence on humping. Thus, when the total content of Si and Mn was controlled not to exceed its defined limit and when O content was suppressed to 0.002% or less, the inventors were able to obtain beads having a sufficient width and regular shape without humping even in a high-speed arc welding process at a welding speed of 100 cm/min or higher.

A further examination on O (oxygen) revealed that although the O content was suppressed to 0.002% or less, if an inner oxide layer in the surface layer of the steel sheet is thicker than 5 µm, oxygen still could adversely affect the high-speed arc welding of the steel sheet. This is possibly because although the oxygen content in the steel sheet may be reduced, if an inner oxide layer exists in the surface layer, oxygen is supplied from the oxide layer to the weld metal, causing humping and narrow beads. However, the present invention is not limited by such estimation mechanism because, according to a preferred embodiment of the invention, excellent high-speed weldability could be realized by suppressing the thickness of the inner oxide layer of the steel sheet to 5 μm or less.

Additional and/or other aspects and advantages of the present invention will be set forth in part in the description which follows and, in part, will be obvious from the description, or may be learned by practice of the invention.

DETAILED DESCRIPTION OF THE PREFERRED EMBODIMENTS

A preferred embodiment of the present invention will be described herein below.

As described above, the main objective or gist of the invention is to specify the total amount of Si and Mn in a steel sheet and to suppress oxygen content. Also, in a preferred embodiment of the invention, it is important to suppress the thickness of an inner oxide layer existing in the surface layer of the steel sheet to 5 μm or less. Thus, the following will describe desired contents of Si, Mn and O first, followed by a desired thickness of the inner oxide layer.

Si: 0.20-2% (the Term "%" Herein Means "mass %", the Same is True Hereinbelow),

Si is an essential element in the invention and is directly involved in increasing bead width in high-speed arc welding. Such an effect is displayed when the Si content in the steel sheet is 0.20% or more, preferably 0.50% or more, and more preferably 0.80% or more. However, if an excessive amount of Si is used, viscosity of molten pool increases too much and thus, humped weld beads are produced. Therefore, the Si content needs to be suppressed to below 3.0% from the viewpoint of weldability. In addition, when the Si content is too high, an amount of slag formed on the bead is increased, coating comes off easily later, and corrosion resistance after coating is deteriorated. Therefore, the Si content needs to be suppressed to 2% or less from the viewpoint of corrosion resistance. In short, the Si content is defined as 2% or less, preferably 1.8% or less, and more preferably 1.5% or less.

Mn: 1-2.5%

Mn, similar to Si, contributes to high-speed weldability, and is an essential element in the invention. Also, Mn plays an important role in securing strength. Therefore, the Mn content is defined as 1% or more, preferably 1.2% or more, and more preferably 1.5% or more. However, if an excessive amount of Mn is used, segregation occurs noticeably and two-ply crack occurs in a punching unit for example, leading to deterioration in workability. Therefore, the Mn content is defined as 2.5% or less, preferably 2.0% or less, and more preferably 1.5% or less.

Si+Mn: 1.5% or More

As aforementioned, if the Si content is too much, coating on the weld portion is easily released, while if the Mn content is too much, workability is deteriorated. Thus, if Si or Mn is used singly, it is difficult to obtain wide beads particularly in a high-speed arc welding at a welding speed of 100 cm/min or higher. This explains why Si and Mn should be applied in combination to the steel sheet. In detail, the lower limit of the total amount of Si and Mn in the steel sheet is defined as 1.5%, preferably, 1.8%, and more preferably 2.0%. Meanwhile, the upper limit of the total amount of Si and Mn is defined as 4.5%, which is a sum of the upper limit of the Si content and that of the Mn content. Since the effect does not increase when each of the Si content and the Mn content is excessive, the total content is preferably defined as 4.2% or less, and more preferably 3.8% or less.

O: 0.002% or Less (Exclusive of 0%)

If an excessive amount of O is contained in the steel sheet, viscosity of the molten pool is lowered too much and as a result, molten metal flowing grows in intensity and humping tends to occur more often. In addition, the weld bead width is also narrow. Therefore, to achieve good high-speed arc weldability, it is important to suppress the O content in the steel sheet of the invention to 0.002% or less, preferably 0.0018%, and more preferably 0.0015% or less. Although it seems to be better off without oxygen at all to ensure good high-speed arc weldability, making the O content 0% is considered not really possible industrially.

The O content in the steel sheet can be reduced by performing a degassing treatment on molten steel by using an RH degassing apparatus (hereinafter referred to as RH degassing treatment). However, the steel sheet of the present invention and the molten steel forming the same contain a large amount of Si and Mn that easily bond with O, deoxygination rate during RH degassing treatment tends to decrease. Thus, to fabricate the steel sheet of the invention having reduced O content of 0.002% or less, RH degassing treatment needs to be performed longer than usual. In detail, in the case that about 250 tons of molten steel undergo RH degassing treatment, although it usually takes about 30 minutes, the invention recommends to extend it to 50 minutes or longer. In so doing, the O content can be reduced to at least ½-⅔ of that in the 30-min long treatment.

Thickness of Inner Oxide Layer Existing in the Surface Layer of the Steel Sheet: 5 μm or Less "Thickness of the inner oxide layer" in the present invention means a maximum distance (maximum depth) of an oxide that exists from the surface to the sheet thickness direction in a cross section perpendicular to the rolling direction. This 'oxide' mainly consists of Si or Mn oxide, but it further contains Ti oxide and the like and exists primarily in ferrite grain boundaries. Thickness of the inner oxide layer can be obtained by observing the cross section of the steel sheet in perpendicular to the rolling direction to a 50 μm depth from the sheet surface on an SEM image (magnifying power: 1,000×). Considering that thickness of the inner oxide layer varies, an average of at least 5 measurements of the thickness in the width direction of the steel sheet is used as the "thickness of the inner oxide layer" in the present invention.

Meanwhile, no matter how low the O content in the steel sheet may be, if the content of Si and Mn is relatively high as a steel sheet of the present invention, the inner oxide layer can still be formed during winding after finish rolling. Hence, in order to fabricate a steel sheet with none or few of the inner oxide layer, it is necessary to reduce the O content in the steel sheet by performing the RH degassing treatment for a sufficient period of time and, at the same time, to perform winding after the finish rolled steel sheet is sufficiently cooled. In particular, to make the inner oxide layer have a thickness of 5 μm or less, it is recommended to perform winding at a temperature below 600° C.

Besides Si, Mn and O, the steel sheet of the invention further contains C, P, S, Al, and N as its major components. Descriptions on those elements are as follows.

C: 0.02-0.25%

C is an effective element for ensuring strength, and the lower limit thereof is designated as 0.02%, preferably, 0.06%, and more preferably 0.08%. However, an excessive amount of C is used, cracks may be formed on solidified weld metals.

Therefore, the upper limit of the C content is designated as 0.25%, preferably 0.22%, and more preferably 0.20%.

P: 0.1% or Less (Exclusive of 0%)

If an excessive amount of P is contained in the steel sheet, cracks might generate during welding. Therefore, the upper limit of the P content is designated as 0.1%, preferably 0.080%, and more preferably 0.060%. In particular, when a steel sheet is expected to be applied for use where there is a tendency for generating welding cracks, the P content is preferably reduced as low as possible. However, it is industrially impossible to reduce the P content in the steel sheet to 0%. In addition, P is an effective element for ensuring strength by solid solution strengthening; the P content is preferably designated as 0.010% or more, and more preferably 0.015% or more.

S: 0.05% or Less (Exclusive of 0%)

S is a harmful element forming inclusions, and deteriorates workability of the steel sheet when added excessively. Therefore, the upper limit of the S content is designated as 0.05%, preferably 0.03%, and more preferably 0.01%. In addition, it is industrially impossible to reduce the S content in the steel sheet to 0%.

Al: 0.02-0.2%

Al is an element required for deoxidization. The Al content is defined as 0.02% or more, preferably 0.025% or more, and more preferably 0.0030% or more. If an excessive amount of Al is used, however, more oxide based inclusions are formed, leading to an increase in scab formation. Therefore, the upper limit of the Al content is defined as 0.2%, preferably 0.15%, and more preferably 0.10%.

N: 0.0015-0.015%

N is an effective element for ensuring strength by solid solution strengthening, and contributes to fine structure by forming nitrides with Al and the like. Therefore, the lower limit of the N content is designated as 0.0015%, preferably 0.0020%, and more preferably 0.0030%. If an excessive amount of N is used, however, blowholes are formed during welding. Thus, the upper limit of the N content is designated as 0.015%, preferably 0.010%, and more preferably 0.0080%.

The steel sheet of the present invention contains the above-described elements as its major composition, and the balance is essentially Fe and inevitable impurities. Depending on raw materials, resources, manufacturing facilities and the like, other inevitable impurities (for example, Sn, Pb, Zn, Sb, and As) may be included as well. Furthermore, if necessary, the steel sheet of the invention may further contain the following elements optionally.

Cr: 0.03-2%

Cr is an effective element for improving quenchability, and may be added to the steel sheet if necessary. The lower limit of the Cr content is 0.03%, preferably 0.10%, and more preferably 0.20%. If an excessive amount of Cr is used, however, coating adhesion is substantially deteriorated even though coating substrate treatment where the coating substrate is immersed in a phosphate bath may have been performed, and it exerts a bad influence upon the base material steel sheet and the corrosion resistance after coating. Therefore, the upper limit of the Cr content is defined as 2%, and preferably 1.5%.

Mo: 0.03-1%

Mo is also effective element for improving quenchability, and may be added to the steel sheet if necessary. The lower limit of the Mo content is defined as 0.03%, preferably 0.10%, and more preferably 0.20%. Similar to Cr, if an excessive amount of Mo is used, however, P treatment efficiency is deteriorated and coating comes off more easily. Therefore, the upper limit of the Mo content is defined as 1%, and preferably 0.8%.

B: 0.0003-0.005%

B is also effective element for improving quenchability, and may be added to the steel sheet if necessary. The lower limit of the B content is defined as 0.0003%, and preferably 0.0005%. However, such an effect does not increase no matter how excessively B may be added and only oxide based inclusions are produced more, thereby resulting in deterioration of workability. Therefore, the upper limit of the B content is defined as 0.005% and preferably 0.003% or less.

Nb: 0.005-0.1%

Nb contributes to the production of crystalline fine particles and the precipitation strengthening, and is an effective element for high strength steel sheets. It may be added to the steel sheet of the invention if needed. The lower limit of the Nb content is defined as 0.005%, preferably 0.020%, and more preferably 0.030%. However, since such effects do not increase no matter how excessively Nb may be added, its upper limit, from the viewpoint of economic efficiency, is defined as 0.1%, and preferably 0.8%.

Ti: 0.005-0.3%

Likewise, Ti contributes to the production of crystalline fine particles and the precipitation strengthening, and is an effective element for high strength steel sheet. It may be added to the steel sheet of the invention if needed. The lower limit of the Ti content is defined as 0.005%, preferably 0.010%, and more preferably 0.020%. If an excessive amount of Ti is added, however, production of TiN inclusions increases sharply and as a result, workability of the steel sheet is deteriorated. Therefore, the upper limit of the Ti content is defined as 0.3%, and preferably 0.20%.

V: 0.005-0.5%

V also contributes to the production of crystalline fine particles and the precipitation strengthening, and is an effective element for high strength steel sheets. It may be added to the steel sheet of the invention if needed. The lower limit of the V content is defined as 0.005%, preferably 0.010%, and more preferably 0.020%. However, since such effects do not increase no matter how excessively V may be added, its upper limit, from the viewpoint of economic efficiency, is defined as 0.5%, and preferably 0.3%.

W: 0.005-0.5%

W is an effective element for high strength steel sheets by precipitation strengthening, and may be added to the steel sheet of the invention if needed. The lower limit of the W content is defined as 0.005%, preferably 0.010%, and more preferably 0.020%. However, since such effects do not increase no matter how excessively W may be added, its upper limit, from the viewpoint of economic efficiency, is defined as 0.5%, and preferably 0.3%.

Cu: 0.03-0.5%

Cu is an effective element for improving corrosion resistance, so it may be added to the steel sheet of the invention if needed. The lower limit of the Cu content is defined as 0.03%, preferably 0.05%, and more preferably 0.08%. However, since such effect does not increase no matter how excessively Cu may be added, its upper limit, from the viewpoint of economic efficiency, is defined as 0.5%, and preferably 0.3%.

Ni: 0.015-0.5%

In the case that the steel sheet contains Cu, it is desired to add Ni in order to prevent cracks. It is not absolutely required to add both Cu and Ni, and even if the steel sheet already contains Cu, Ni is not required to be added. The ratio of Ni mass % in the steel sheet to Cu mass % in the steel sheet is preferably about 0.5. Therefore, the lower limit of the Ni content is defined as 0.015%, which is ½ of the lower limit of the Cu content. However, since the benefit of the Ni addition does not increase simply by adding Cu excessively more than the Cu mass %, the upper limit of the Ni content is defined as the same as the Cu, namely, 0.5%, and preferably 0.3%.

Ca: 0.0005-0.005%

Ca is an effective element for improving workability of the steel sheet by enhancing the shape of inclusions, so it may be added to the steel sheet if needed. The lower limit of the Ca content is defined as 0.0005%, preferably 0.0010%, and more preferably 0.0020%. However, such effect does not increase despite an excessive amount of Ca present, and oxide based inclusions are produced more, which only deteriorates workability. Therefore, the upper limit of the Ca content is defined as 0.005%, and preferably 0.003%.

Rare Earth Elements: 0.0005-0.005%

Similar to Ca, rare earth elements (also known as REM) are effective for improving workability of the steel sheet by enhancing the shape of inclusions, so they may be added to the steel sheet if needed. The lower limit of the REM content is defined as 0.0005%, preferably 0.0010%, and more preferably 0.0020%. Like Ca, such effect does not increase despite an excessive amount of REM present, and only workability of the steel sheet is deteriorated. Therefore, the upper limit of the REM content is defined as 0.005%, and preferably 0.003%.

Zr and/or Mg: 0.0005-0.005% in Total

Both Zr and Mg contribute to dispersion of inclusions and size reduction of TiN, and are effective elements for improving workability of the steel sheet so they may be added if needed. The lower limit of the total amount is defined as 0.0005%, and preferably 0.0010%. However, production of oxide based inclusions is increased and workability of the steel sheet is degraded if Zr and Mg are added excessively. Therefore, the upper limit of the total amount is defined as 0.005%, and preferably 0.0030%.

Co: 0.03-1%

Co is an effective element for reducing an amount of solid fused carbon in the ferrite and for improving workability of the steel sheet, particularly, elongation of the steel sheet so it may be added to the steel sheet if needed. The lower limit of the Co content is defined as 0.03%, and preferably 0.05%. However, since such effects do not increase no matter how excessively Co may be added, its upper limit, from the viewpoint of economic efficiency, is defined as 1%, and preferably 0.80%.

The steel sheet of the present invention is characterized by its chemical composition, especially, Si, Mn and O contents and the thickness of the inner oxide layer. In effect, in the present invention, there is no specific limit to the thickness of the steel sheet itself. However, if the steel sheet is too thin, it may be melted away in the high-speed arc welding. On the other hand, increasing the thickness of the steel sheet contracts the demand of light steel sheets. Thus, a desirable thickness of the steel sheet ranges 1 to 5 mm.

EXAMPLES

Although preferred examples of the present invention are disclosed and described in detail below, it is to be understood that the invention is not limited thereto, and the invention can be modified to a certain extent as long as modifications are in accordance with the objectives of the invention described before and hereinafter and those modifications are included within the technical scope of the invention.

1. Fabrication of Steel Sheet

A molten steel decarburized in a converter was secondarily refined in a LF (ladle refining furnace), and mixed with alloy elements and subjected to the RH degassing treatment in an RH degassing apparatus to prepare the molten steel having the chemical composition listed in Table 1. Only the molten steels corresponding to the steel sheet No. 109 having high O content (O: 0.0035%) was subjected to the RH degassing treatment for 30 minutes (average treatment time), and the others went through the RH degassing treatment for 50 minutes and the O content therein was reduced to 0.002% or less.

Then, continuous casting was performed on the steel, and a slab thusly obtained was subjected to a hot scarfing treatment, heated at 1,200-1,250° C. in a furnace, subjected to descaling using high pressure water, and rolled by a roughing mill to a thickness of 40 mm. Later, the slab temperature was controlled to 1,000-1,100° C., and the slab was again descaled under high pressure water and subjected to finish rolling. For the finish rolling, the slab was continuously rolled for 7 stands, and the rolling temperature was controlled so that the temperature on the finish exit side was in a range of 850 to 900° C.

2-4 seconds later, the sheet from the finish roller was then supercooled (water cooling) at a cooling rate of 20-60° C./sec, and carried to a coiler to be wound at a winding temperature specified in Table 2 (indicated as "CT" in Table 2). When the winding temperature was higher than 600° C. (Steel sheet Nos. 112 and 113), the thickness of their inner oxide layers (indicated as "Oxide layer" in Table 2) exceeded 5 μm.

The wound coils were put aside and cooled at ambient pressure down to 100° C. or below, and passed through the skin pass and leveler to form cracks on the scales (elongation ratio: 0.3-0.5%). Then, the coils were pickled by hydrochloric acid to remove scales therefrom, and coated with rustproofing oil to fabricate steel sheet Nos. 1-23 (examples of the invention) and steel sheet Nos. 101-113 (comparative examples).

TABLE 1

| Steel sheet | Si | Mn | Si + Mn | O | C | P | S | Al | N | Others |
|---|---|---|---|---|---|---|---|---|---|---|
| 1 | 0.25 | 1.30 | 1.55 | 0.0012 | 0.02 | 0.080 | 0.0020 | 0.035 | 0.0020 | Cu: 0.30, Ni: 0.30 |
| 2 | 0.25 | 1.30 | 1.55 | 0.0014 | 0.06 | 0.018 | 0.0020 | 0.040 | 0.0020 | — |
| 3 | 0.80 | 1.50 | 2.30 | 0.0017 | 0.07 | 0.018 | 0.0200 | 0.035 | 0.0020 | Ti: 0.015 |
| 4 | 0.50 | 1.50 | 2.00 | 0.0012 | 0.06 | 0.010 | 0.0010 | 0.035 | 0.0020 | Nb: 0.030, Ca: 0.0020 |
| 5 | 0.60 | 1.30 | 1.90 | 0.0015 | 0.03 | 0.080 | 0.0010 | 0.035 | 0.0020 | Cu: 0.20, Ni: 0.10, Nb: 0.025, Ca: 0.0015 |
| 6 | 1.10 | 1.10 | 2.20 | 0.0011 | 0.07 | 0.010 | 0.0030 | 0.035 | 0.0019 | Cu: 0.30, Ni: 0.20, Cr: 0.20, Ca: 0.0012 |
| 7 | 1.50 | 1.10 | 2.60 | 0.0018 | 0.11 | 0.010 | 0.0010 | 0.035 | 0.0020 | Cr: 0.10, Ca: 0.0020 |
| 8 | 0.90 | 1.65 | 2.55 | 0.0015 | 0.04 | 0.080 | 0.0010 | 0.035 | 0.0020 | Cu: 0.30, Ni: 0.30, Ti: 0.150 |
| 9 | 1.00 | 1.40 | 2.40 | 0.0009 | 0.035 | 0.007 | 0.0015 | 0.030 | 0.0030 | Ti: 0.145 |
| 10 | 0.20 | 1.50 | 1.70 | 0.0012 | 0.08 | 0.018 | 0.0030 | 0.025 | 0.0020 | Nb: 0.050, Ti: 0.160 |
| 11 | 2.00 | 1.50 | 3.50 | 0.0017 | 0.13 | 0.100 | 0.0005 | 0.035 | 0.0036 | Cr: 0.10 |

TABLE 1-continued

| Steel sheet | Si | Mn | Si + Mn | O | C | P | S | Al | N | Others |
|---|---|---|---|---|---|---|---|---|---|---|
| 12 | 0.20 | 1.50 | 1.70 | 0.0019 | 0.22 | 0.010 | 0.0030 | 0.032 | 0.0050 | Cu: 0.09, Cr: 0.30, Ti: 0.030, B: 0.0027 |
| 13 | 0.20 | 1.30 | 1.50 | 0.0012 | 0.23 | 0.010 | 0.0035 | 0.035 | 0.0020 | Cu: 0.08, Cr: 0.25, Ti: 0.030, B: 0.0003 |
| 14 | 0.20 | 2.20 | 2.40 | 0.0015 | 0.22 | 0.010 | 0.0030 | 0.035 | 0.0020 | — |
| 15 | 1.00 | 1.40 | 2.40 | 0.0011 | 0.035 | 0.010 | 0.0015 | 0.180 | 0.0030 | — |
| 16 | 1.50 | 1.00 | 2.50 | 0.0009 | 0.22 | 0.010 | 0.0030 | 0.032 | 0.0050 | Cr: 1.30 |
| 17 | 0.25 | 1.30 | 1.55 | 0.0014 | 0.06 | 0.018 | 0.0020 | 0.035 | 0.0020 | Mo: 0.2 |
| 18 | 0.25 | 1.30 | 1.55 | 0.0014 | 0.06 | 0.018 | 0.0020 | 0.035 | 0.0020 | V: 0.015 |
| 19 | 0.25 | 1.30 | 1.55 | 0.0014 | 0.06 | 0.018 | 0.0020 | 0.035 | 0.0020 | W: 0.010 |
| 20 | 0.25 | 1.30 | 1.55 | 0.0014 | 0.06 | 0.018 | 0.0020 | 0.035 | 0.0020 | REM: 0.0010 |
| 21 | 0.25 | 1.30 | 1.55 | 0.0014 | 0.06 | 0.018 | 0.0020 | 0.035 | 0.0020 | Zr: 0.002 |
| 22 | 0.25 | 1.30 | 1.55 | 0.0014 | 0.06 | 0.018 | 0.0020 | 0.035 | 0.0020 | Co: 0.05 |
| 23 | 0.25 | 1.30 | 1.55 | 0.0014 | 0.06 | 0.018 | 0.0020 | 0.035 | 0.0020 | Mg: 0.0005 |
| 101 | 0.50 | 1.30 | 1.80 | 0.0015 | 0.0030 | 0.080 | 0.0020 | 0.035 | 0.0020 | — |
| 102 | 0.25 | 1.00 | 1.25 | 0.0008 | 0.06 | 0.018 | 0.0020 | 0.040 | 0.0020 | — |
| 103 | 0.80 | 1.50 | 2.30 | 0.0014 | 0.07 | 0.018 | 0.0200 | 0.035 | 0.0060 | Ti: 0.32 |
| 104 | 0.60 | 1.30 | 1.90 | 0.0019 | 0.45 | 0.080 | 0.0010 | 0.035 | 0.0020 | Cu: 0.20, Ni: 0.10, Nb: 0.025, Ca: 0.0015 |
| 105 | 0.01 | 1.50 | 1.51 | 0.0013 | 0.11 | 0.010 | 0.0010 | 0.035 | 0.0020 | Cr: 0.10, Ca: 0.0020 |
| 106 | 3.00 | 1.65 | 4.65 | 0.0011 | 0.04 | 0.080 | 0.0010 | 0.035 | 0.0020 | Cu: 0.30, Ni: 0.30, Ti: 0.150 |
| 107 | 0.20 | 3.00 | 3.20 | 0.0011 | 0.23 | 0.010 | 0.0035 | 0.035 | 0.0020 | Cu: 0.08, Cr: 0.25, Ti: 0.030, B: 0.0003 |
| 108 | 0.20 | 0.45 | 0.65 | 0.0018 | 0.22 | 0.010 | 0.0030 | 0.032 | 0.0050 | Cr: 1.30 |
| 109 | 0.20 | 1.30 | 1.50 | 0.0035 | 0.035 | 0.005 | 0.0100 | 0.022 | 0.0045 | — |
| 110 | 0.05 | 1.55 | 1.60 | 0.0009 | 0.10 | 0.009 | 0.0100 | 0.040 | 0.0030 | — |
| 111 | 0.15 | 1.45 | 1.60 | 0.0012 | 0.08 | 0.012 | 0.0060 | 0.033 | 0.0028 | — |
| 112 | 1.10 | 1.10 | 2.20 | 0.0011 | 0.07 | 0.010 | 0.0030 | 0.035 | 0.0030 | — |
| 113 | 1.10 | 1.10 | 2.20 | 0.0011 | 0.07 | 0.010 | 0.0030 | 0.035 | 0.0030 | — |

The balance is essentially Fe and inevitably impurities (Unit: mass %)

In addition, when the O content was about 0.002%, any of conventionally employed methods can be used. In the present invention, O contents were measured in order of ppm by Combustion-Infrared Absorption Spectrometry.

2. Measurement of Thickness of Inner Oxide Layers of Steel Sheets

Using the steel sheets thusly obtained, the cross sections in perpendicular to the rolling direction were observed to the depth of 50 μm per each point on SEM images (magnifying power: 1000×), and the thickness of the respective inner oxide layers was measured. The measurement results are shown in Table 2 (indicated as "Oxide layer" in Table 2). It should be noted that the thicknesses of the inner oxide layers shown in Table 2 are average values of 5 arbitrarily selected ones in the width direction of each steel sheet.

3. Measurement of Mechanical Properties of Steel Sheets

As mechanical properties of each steel sheet, tensile strength (MPa), elongation (%), and hole expansion ratio (%) were measured, and their measurement results are shown in Table 2 (In Table 2, tensile strength is indicated as "TS", elongation "El", and hole expansion ratio "λ"). Here, the definition and test method of hole expansion followed "Hole Expansion Test Method JFST1001-1996", the standard of Japan Iron and Steel Federation.

Tensile strength, elongation, and hole expansion ratio were evaluated as good when they are 600 MPa or more, 15% or more, and 50% or more, respectively.

4. Welding of Steel Sheets

The welding conditions of the steel sheets were as follows:
Sheet thickness of steel sheet: 2.9 mm.
Welder: Pulse welder,
1 Joint form: lateral lap fillet welding,
Torch slope angle: movement angle: 45°, and operating angle: 10° for the forward movement,
Shielded gas composition: Ar: 80 vol %, and $CO_2$: 20 vol %
(In welding of the steel sheet No. 23, a shielded gas composition was Ar: 90 vol %, and $CO_2$: 10 vol %.)
Arc Welding Current Current was adjusted in accordance with given welding speed as follows. In addition, an optimal voltage was selected depending on shielded gas compositions;
80 cm/min: 210 A
90 cm/min: 230 A
100 cm/min: 250 A
110 cm/min: 270 A
120 cm/min: 290 A
130 cm/min: 310 A
140 cm/min: 330 A
150 cm/min: 350 A
Welding wire: Copper plated wire
(In welding of the steel sheet No. 21, a non-copper plated welding wire was used.),
Wire diameter: 1.2 mm,
Wire composition: C: 0.05% (the term "%" herein means "mass %", the same is true hereinbelow), Si: 0.81%, Mn: 1.25%, P: 0.010%, and S: 0.015%
(In welding of the steel sheet No. 22, the welding wire had the composition of C: 0.06%, Si: 0.25%, Mn: 1.34%, P: 0.012%, S: 0.018%, Ti: 0.05%; and in welding of the steel sheet No. 23, the welding wire had the composition of C: 0.06%, Si: 0.30%, Mn: 1.25%, P: 0.007%, and S: 0.010%.), and Extruded length (contact-to-work distance) of welding wire: 15 mm 5. Evaluation of Weldability of Steel Sheets (1) Speed Limit The welding speed was increased from 80 cm/min to 10 cm/min for welding the steel sheets, and a speed limit that does not cause humping defect was obtained. The results are shown in Table 2. A steel sheet was evaluated to have a good high-speed weldability if the speed limit thereof was 100 cm/min or higher.

(2) Bead Width

Bead width was measured when a steel sheet was welded at a welding speed of 100 cm/min. The results are shown in Table 2. It should be noted that the bead widths in Table 2 are average values of 3 arbitrary selected bead widths of typical spots of welding. A steel sheet was evaluated to have a good high-speed weldability if the bead width thereof was 7.0 mm or more.

Fracture Position

Steel sheets were welded at a welding speed of 100 cm/min, and test pieces of 25 mm in width were collected from their lap fillet joints to be subjected to a joint tension test.

It was decided whether the fracture position was in the base material (steel sheet) or the weld metal. A steel sheet was evaluated to have a good joint strength if the base material was fractured Moreover, although it was the weld metal that was fractured, if its fracture strength was 600 MPa or greater (the target tensile strength of steel sheets), the subject steel sheet was evaluated to have a good joint strength.

TABLE 2

| Steel sheet | CT (° C.) | Oxide layer (μm) | TS (MPa) | El (%) | TS × El | λ (%) | Speed limit (cm/min) | Bead width (mm) | Fracture position*[1] |
|---|---|---|---|---|---|---|---|---|---|
| 1 | 500 | 0 | 720 | 23 | 16560 | 100 | 110 | 7.3 | Base material |
| 2 | 500 | 0 | 810 | 21 | 17010 | 90 | 110 | 7.2 | Base material |
| 3 | 500 | 0 | 820 | 22 | 18040 | 70 | 140 | 8.0 | Base material |
| 4 | 500 | 0 | 800 | 19 | 15200 | 85 | 130 | 7.7 | Base material |
| 5 | 500 | 0 | 770 | 24 | 18480 | 90 | 130 | 7.7 | Base material |
| 6 | 500 | 0 | 830 | 22 | 18260 | 70 | 140 | 8.0 | Base material |
| 7 | 500 | 0 | 800 | 18 | 14400 | 65 | 150 | 8.1 | Base material |
| 8 | 500 | 0 | 780 | 22 | 17160 | 80 | 140 | 7.9 | Base material |
| 9 | 500 | 0 | 775 | 22 | 17050 | 90 | 150 | 8.2 | Base material |
| 10 | 500 | 0 | 795 | 18 | 14310 | 70 | 100 | 7.1 | Base material |
| 11 | 500 | 0 | 850 | 17 | 14450 | 70 | 150 | 8.0 | Base material |
| 12 | 500 | 0 | 845 | 16 | 13520 | 60 | 100 | 7.0 | Base material |
| 13 | 500 | 0 | 890 | 15 | 13350 | 55 | 100 | 7.2 | 825 |
| 14 | 500 | 0 | 880 | 17 | 14960 | 70 | 100 | 7.1 | 800 |
| 15 | 500 | 0 | 800 | 21 | 16800 | 80 | 150 | 8.1 | Base material |
| 16 | 500 | 0 | 900 | 15 | 13500 | 65 | 150 | 8.0 | 785 |
| 17 | 500 | 0 | 810 | 20 | 16200 | 70 | 110 | 7.4 | Base material |
| 18 | 500 | 0 | 800 | 21 | 16800 | 75 | 120 | 7.1 | Base material |
| 19 | 500 | 0 | 790 | 20 | 15800 | 70 | 110 | 7.2 | Base material |
| 20 | 500 | 0 | 780 | 20 | 15600 | 85 | 110 | 7.2 | Base material |
| 21*[2] | 500 | 0 | 775 | 21 | 16275 | 70 | 110 | 7.2 | Base material |
| 22*[3] | 500 | 0 | 780 | 22 | 17160 | 85 | 110 | 7.3 | Base material |
| 23*[4] | 500 | 0 | 765 | 19 | 14535 | 75 | 120 | 7.1 | Base material |

*[1]If the fracture position is in a weld metal not a base material (steel sheet), the fracture strength at that time is stated (unit: MPa).
*[2]In welding of steel sheet No. 21, a non-copper plated welding wire was used.
*[3]In welding of steel sheet No. 22, a welding wire having the composition of
C: 0.06, Si: 0.25, Mn: 1.34, P: 0.012, S: 0.018, Ti: 0.05 (Unit: mass %) was used.
*[4]In welding of steel sheet No. a welding wire having the composition
of: 0.06, Si: 0.30, Mn: 1.25, P: 0.007, and S: 0.010 (Unit: mass %) and shielded gases of Ar: 90 and $CO_2$: 10 (Unit: vol %) were used.

| Steel sheet | CT (° C.) | Oxide layer (μm) | TS (MPa) | El (%) | TS × El | λ (%) | Speed limit (cm/min) | Bead width (mm) | Fracture position*[1] |
|---|---|---|---|---|---|---|---|---|---|
| 101 | 500 | 0 | 470 | 30 | 14100 | 110 | 130 | 7.5 | Base material |
| 102 | 500 | 0 | 780 | 21 | 16380 | 80 | 100 | 6.0 | Base material |
| 103 | 500 | 0 | 795 | 19 | 15105 | 40 | 110 | 7.8 | Base material |
| 104*[2] | 500 | 0 | 965 | 12 | 11580 | 35 | 130 | 7.5 | 805 |
| 105 | 500 | 0 | 775 | 21 | 16275 | 80 | 90 | — | Base material |
| 106*[3] | 500 | 0 | 790 | 22 | 17380 | 75 | 90 | — | Base material |
| 107 | 500 | 0 | 900 | 10 | 9000 | 35 | 100 | 7.2 | 770 |
| 108 | 500 | 0 | 510 | 15 | 7650 | 40 | 100 | 5.5 | Base material |
| 109 | 500 | 0 | 800 | 20 | 16000 | 70 | 90 | — | Base material |
| 110 | 500 | 0 | 810 | 20 | 16200 | 70 | 90 | — | Base material |
| 111 | 550 | 0 | 810 | 19 | 15390 | 65 | 100 | 6.5 | Base material |
| 112 | 600 | 6 | 790 | 17 | 13430 | 85 | 100 | 6.0 | Base material |
| 113 | 650 | 8 | 820 | 18 | 14760 | 100 | 90 | — | Base material |

*[1]If the fracture position is in a weld metal and not a base material (steel sheet), the fracture strength at that time is stated (unit: MPa).
*[2]In welding of steel sheet No. 104, cracks were formed on the solid weld metal.
*[3]In welding of steel sheet No. 106, a lot of slags were formed on the bead.

As obvious from the results in Table 2, the steel sheet Nos. 1-23 satisfying the requirements of chemical composition and thickness of the inner oxide layer had excellent high-speed weldability, i.e., the arc welding speed limit of 100 cm/min or higher and bead width of 7.0 mm or more at the arc welding speed of 100 cm/min, and exhibited good joint strengths (their fracture positions were in base materials or the fracture strengths were 600 MPa or greater even though the weld metals were fractured.) In addition, steel sheet Nos. 23 and 24 had tensile strengths of 600 MPa or greater, elongation rates of 15% or more, and hole expansion ratios of 50% or more, proving that each has high strength and good workability.

Steel sheet No. 101 had the C content below the lower limit defined by the invention, and insufficient tensile strength of 471 MPa.

Steel sheet No. 102 had the content of Si+Mn below the lower limit defined by the invention, narrow bead widths of 6.0 mm, and unsatisfactory high-speed weldabilities.

Steel sheet No. 103 had the Ti content exceeding the upper limit defined by the invention, and insufficient hole expansion ratio (workability) of 40% due to an increase in inclusions.

Steel sheet No. 104 had the C content exceeding the upper limit defined by the invention, and low workability (elongation and hole expansion ratio). Also, cracks were formed on the solid weld metal. This is because the excessive amount of C in the steel sheet increased the C content in the weld metal as well.

Steel sheet No. 105 had the Si content below the lower limit defined by the invention, was easily humped, had a low arc welding speed limit of 90 cm/min, and exhibited unsatisfactory high-speed weldability.

Steel sheet No. 106 had the Si content exceeding the upper limit defined by the invention, and the coating came off easily due to a great amount of slag formed on its beads. Also, it exhibited deteriorated corrosion resistance. Since the Si content was as high as 3.00%, the viscosity of molten pool was increased too much, thereby causing humping.

Steel sheet No. 107 had the Mn content exceeding the upper limit defined by the invention, and exhibited inferior workability (elongation and hole expansion ratio).

Steel sheet No. 108 had the Mn content below the lower limit defined by the invention and thin bead width of 5.5 mm, and exhibited unsatisfactory high-speed weldability. Also, it had inferior tensile strength of 510 MPa.

Steel sheet No. 109 had the O content exceeding the upper limit defined by the invention, was easily humped due to the excessively poor viscosity of molten pool, and exhibited the arc welding speed limit of 90 cm/min which is inferior high-speed weldability.

Steel sheet No. 110 had the Si content below the lower limit defined by the invention, was easily humped during welding, and exhibited the arc welding speed limit of 90 cm/min which is inferior high-speed weldability.

Steel sheet No. 111 had the Si content below the lower limit defined by the invention and thin bead width of 6.5 mm due to poor viscosity of molten pool, and exhibited unsatisfactory high-speed weldability.

Steel sheet No. 112 had a 6 µm thick inner oxide layer, thin bead width of 6.0 mm due to poor viscosity of molten pool, and exhibited unsatisfactory high-speed weldability.

Steel sheet No. 113 had an 8 µm thick inner oxide layer, was easily humped due to poor viscosity of molten pool, and exhibited the arc welding speed limit of 90 cm/min which is inferior high-speed weldability.

Moreover, in Tables 2-1 and 2-2, the oxide layer "0" means that no oxide layer was observed under given method.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A steel sheet, consisting of
Si: 0.20-2% (the term "%" herein means "mass %", the same is true hereinbelow),
Mn: 1.5-2.5%, and
O: 0.002% or less (exclusive of 0%),
C: 0.02-0.25%,
P: 0.1% or less (exclusive of 0%),
S: 0.05% or less (exclusive of 0%),
Al: 0.02-0.2%,
N: 0.0015-0.015%, and
at least one element selected from the group consisting of Cr: 0.03-2% and B: 0.0003-0.005%,
optionally at least one element selected from the group consisting of Nb: 0.005-0.1%, Ti: 0.005-0.3%, V: 0.005-5%, W: 0.005-0.5%, Cu: 0.03-0.5%, Ca: 0.0005-0.005%, REM (rare earth elements): 0.0005-0.005%, Zr and Mg: 0.0005-0.005% in total, Co: 0.03-1% and Ni: 0.015-0.5%, and
the balance being iron and inevitable impurities, wherein a thickness of an inner oxide layer existing in a surface layer of the steel sheet is 5 µm or less (inclusive of 0 µm), which steel sheet has a tensile strength of not less than 720 MPa.

2. The steel sheet of claim 1, wherein at least one element selected from the group consisting of Nb: 0.005-0.1%, Ti: 0.005-0.3%, V: 0.005-5%, and W: 0.005-0.5% is present.

3. The steel sheet of claim 1, wherein Cu: 0.03-0.5% is present.

4. The steel sheet of claim 1, wherein at least one of: Ca: 0.0005-0.005% and REM (rare earth elements): 0.0005-0.005% is present.

5. The steel sheet of claim 1, wherein Zr and Mg: 0.0005-0.005% in total are present.

6. The steel sheet of claim 1, wherein Co: 0.03-1% is present.

7. The steel sheet of claim 1, wherein Ni: 0.015-0.5% is present.

8. The steel sheet of claim 1, wherein the steel sheet has an elongation of 15% or more.

9. The steel sheet of claim 1, wherein the steel sheet has a hole expansion ratio of 50% or more.

10. A method of making a steel sheet, the method comprising
hot rolling a steel consisting of
Si: 0.20-2% (the term "%" herein means "mass %", the same is true hereinbelow),
Mn: 1.5-2.5%,
O: 0.002% or less (exclusive of 0%),
C: 0.02-0.25%,
P: 0.1% or less (exclusive of 0%),
S: 0.05% or less (exclusive of 0%),
Al: 0.02-0.2%,
N: 0.0015-0.015%, and
at least one element selected from the group consisting of Cr: 0.03-2% and B: 0.0003-0.005%,
optionally at least one element selected from the group consisting of Nb: 0.005-0.1%, Ti: 0.005-0.3%, V: 0.005-5%, W: 0.005-0.5%, Cu: 0.03-0.5%, Ca: 0.0005-0.005%, REM (rare earth elements): 0.0005-0.005%, Zr and Mg: 0.0005-0.005% in total, Co: 0.03-1% and Ni: 0.015-0.5%, and
the balance being iron and inevitable impurities; and
producing the steel sheet of claim 1.

11. The steel sheet of claim 1, wherein Si: 0.80-1.5%.

12. The steel sheet of claim 1, wherein O: 0.0015% or less (exclusive of 0%).

13. The steel sheet of claim 1, which is made by a method which comprises hot rolling followed by cooling at a rate of 20-60° C./second and winding at a temperature below 600° C.

* * * * *